United States Patent [19]
Dahms

[11] 3,915,810
[45] Oct. 28, 1975

[54] APPARATUS FOR ANALYSIS OF LIQUIDS
[76] Inventor: Harald Dahms, 22 Lakeview Rd., Ossining, N.Y. 10562
[22] Filed: Oct. 30, 1973
[21] Appl. No.: 411,290

Related U.S. Application Data
[62] Division of Ser. No. 182,468, Sept. 21, 1971, abandoned.

[52] U.S. Cl. .............................. 204/195 R; 204/1 T
[51] Int. Cl. ........................................... G01n 27/46
[58] Field of Search............ 204/1 T, 195 R, 195 T, 204/195 G; 23/253 R

[56] References Cited
UNITED STATES PATENTS
2,886,771  5/1959  Vincent........................... 204/195 R
3,208,926  9/1965  Eckfeldt.......................... 204/195 R
3,413,199  11/1968  Morrow .......................... 204/195 R
3,764,267  10/1973  Farr ................................. 23/253 R Primary Examiner—T. Tung

[57] ABSTRACT

An electrochemical apparatus for measuring the concentration of chlorine in water. After filling the sensor with the water to be analyzed, the flow of water is stopped and the electric current from the sensor is integrated. The integrated current is an indication of the concentration of chlorine in water. Species other than chlorine may also be measured.

10 Claims, 6 Drawing Figures

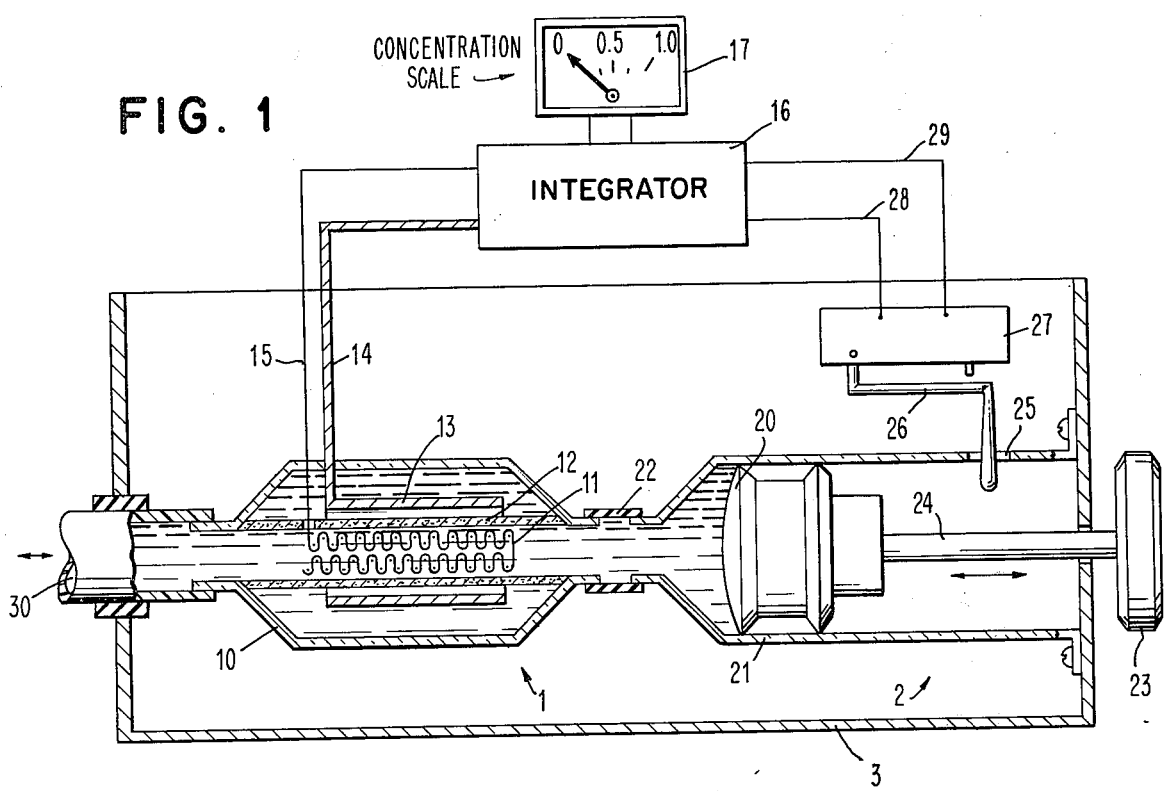
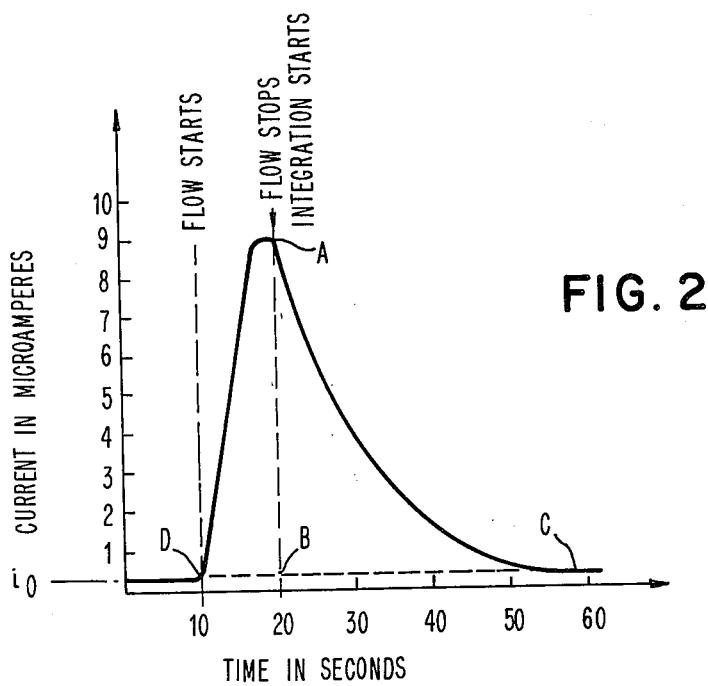

APPARATUS FOR ANALYSIS OF LIQUIDS

This is a division, of application Ser. No. 182,468 filed Sept. 21, 1971 now abandoned.

The fast and accurate analysis of liquids is of ever increasing importance, especially in fields such as the analysis of polluted waters. The pollution of water has often to be detected without delay in situ with portable equipment. Many such analyses have to be performed by personnel with limited or no specific training in the use of instrumentation. It is, therefore, desirable to provide instrumentation which does not require such relatively difficult procedures as the addition of reagent solutions to the test samples or the calibration of the instrument.

In the present invention an electrochemical device is provided which generally does not require any addition of reagents or any standardization procedure. After filling the electrochemical sensor with the water to be analyzed, the flow of water is stopped and the electric current from the sensor is integrated. The integrated current indicates the concentration of chlorine in water.

It is an object of the present invention to provide an apparatus for the rapid, simple, and accurate measurement of the concentration of chlorine in water.

The foregoing and other objects, features and advantages of this invention will be apparent from the following more particular description of the preferred embodiments of the invention, as illustrated in the accompanying drawings.

FIG. 1 is a view, partly in cross section, of an apparatus used for the measurement of the concentration of chlorine in water.

FIG. 2 is a schematic representation of the electric current flowing through the sensor of the apparatus during its operation.

Figure 3:
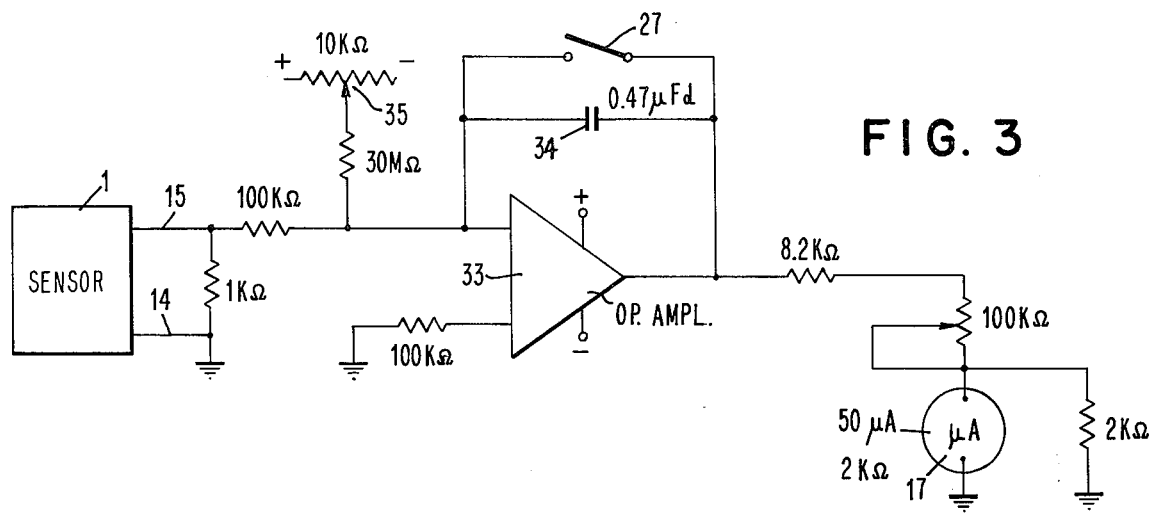
FIG. 3 is a schematic representation of an electronic circuit used for the integration of the sensor circuit.

Referring now to FIG. 1, there is shown a sensor, generally indicated at 1, and a syringe, generally indicated at 2, both mounted on chassis 3. The sensor 1, of cylindrical structure, is contained in housing 10 which may be made of inert material such as glass or plastic. Electrode 11 is located in the center of sensor 1. Electrode 11 is most preferably made of platinum wire gauze. A piece of platinum wire gauze is rolled to form a cylindrical structure. While platinum wire gauze is most preferable other materials and configurations may be used. Such other materials are, for example, gold, graphite, and other platinum group metals (ruthenium, rhodium, palladium, osmium, and iridium). Other configurations are, for example, wires, coils, or plates. Electrode 11 is enclosed in cylindrical separator tubing 12. The separator 12 may be made of materials such as glass fiber or other porous material. The function of separator tubing 12 is to provide electrolytic conduction when it is soaked with water and to restrict the flow of water between electrode 11 and counter electrode 13. Counter electrode 13 is a tubing made of copper. Copper wire wrapped around separator 12 or other configurations may also be used. While copper is most preferable many other materials which provide a stable voltage when in contact with water may also be used. Such materials are known to those skilled in the art. They include graphite, silver, and other metals. While it is preferable to employ separator 12 the device may also be operated without it. The electrical current is transmitted through leads 14 and 15 to integrator 16. The result is displayed on a readout device such as meter 17, which may indicate the reading in terms of concentration of chlorine, for example in milligrams of chlorine per liter of water.

Syringe 2 contains piston 20, moving in barrel 21, which is connected to sensor 1 by connector 22. Piston 20 is connected to handle 23 with rod 24. Barrel 21 contains an opening 25. Arm 26 of switch 27 reaches through opening 25. When piston 20 is pulled back so that the syringe is filled, piston 20 is pushing arm 26 upward, thus actuating switch 27 which is connected to integrator 16 by means of leads 28 and 29.

In operation, handle 23 is pulled out, thus introducing water to be analyzed through inlet 30 into sensor 1 and filling syringe 2. When syringe 2 is about filled piston 20 actuates switch 27 through arm 26 and at about the same time, generally within less than 0.5 second, the flow of water into the sensor is stopped since piston 20 hits chassis 3. Actuation of switch 27 starts integrator 16 which integrates the electrical current flowing through sensor 1 through leads 14 and 15 into integrator 16. The result of the integration is displayed on readout 17 which may be a meter employing a needle or a digital device. The result of the integration can then be read after a certain time, for example after 30 seconds or after 1 minute.

In order to illustrate the function of integrator 16, FIG. 2 is provided which shows the electrical current flowing through sensor 1 and integrator 16 in dependence of time. When the sensor is not in use, i.e., when the piston is not moving, a small background current $i_o$ is flowing. When the syringe is being filled (starting at $t=10$ seconds) the current rises rapidly. At $t=20$ seconds the syringe has been filled and the integrator 16 is started while the flow of water is stopped at this point in time. The integrator is now integrating over time the current flowing between 20 and 60 seconds, i.e., it is measuring the area ABC of FIG. 2. The integral of electrical current over time is known to be equivalent to electrical charge, measured in coulombs. I have found that such integral, i.e., the electrical charge, is an indication of chlorine concentration in water. The particular time interval of 10 seconds for moving piston 20 is just given as example. The result of the analysis does not significantly depend on the time needed for filling the syringe if the the syringe is filled with an even, continuous stroke within a certain time. I prefer to fill the syringe within at least 0.5 seconds and maximally within 10 seconds.

For most accurate results the integrator is adjusted so that the background current $i_o$ is not entering into the integration. However, inclusion of $i_o$ into the integration, while less desirable, is also acceptable depending on the required precision. While it is most preferable to start integration when the flow of water through the sensor is stopped it is possible, although less desirable, to fill the syringe very rapidly, for example in less than 1 second, and to start integration when starting to fill the syringe or even before starting to fill the syringe. Area DAC is then obtained as integral.

An embodiment of the integrator is shown in FIG. 3. Current from sensor 1 enters operational amplifier 33. The amplifier used in this embodiment is made by Analog Devices of Cambridge, Massachusetts, model AD 741K. Capacitor 34 is the integrating element in the circuit. Switch 27 is normally closed (when piston 20 is not actuating arm 26) thus short-circuiting capacitor 34. Integration will start when switch 27 is opened by the outward motion of piston 20 which raises arm 26. Integration proceeds and the result is displayed on meter 17. Before using the integrator the background current $i_o$ can be prevented from entering into the integral by setting potentiometer 35.

It is understood that either the total current from sensor 1 may be used for integration or any part of that current may be used for that purpose. In the embodiment shown in FIG. 3 only about 1% of the current was used. The integral amounts in this case to only 1% and the readout 17 is calibrated accordingly.

I have, for example, built a sensor in the following way. A piece of platinum wire gauze 8 × 25 mm was rolled to form a cylinder of 8 mm length and 3.5 mm diameter, serving as electrode 11. The platinum wire gauze was obtained from A. H. Thomas Co. of Philadelphia, Pa., catalog number 8304. A woven glass fiber tubing of 30 mm length as used for insulation of electrical wires at high temperature served as separator 12. The glass fiber tubing, having a diameter of between 3 and 4 mm when stretched, was slipped over the platinum gauze cylinder. Copper wire of about 0.5 mm diameter, serving as counter electrode 13, was wrapped around the glass fiber tubing. The whole structure was then mounted and sealed into a glass tubing leaving only an inlet and an outlet opening. A 10 milliliter plastic disposable medical syringe (Becton-Dickinson and Company) served as syringe 2.

A microampere meter was connected to the sensor leads (platinum lead positive, copper wire negative). When water containing 0.5 milligrams chlorine per liter was sucked through the sensor into the syringe, the current as shown in FIG. 2 was obtained. When the integral of the current measured 1 minute after the introduction of the water sample was recorded as a function of the chlorine concentration of the water in the range 0 – 2 milligrams chlorine per liter, it was found that the integral was directly proportional to the chlorine concentration.

Figure 4:
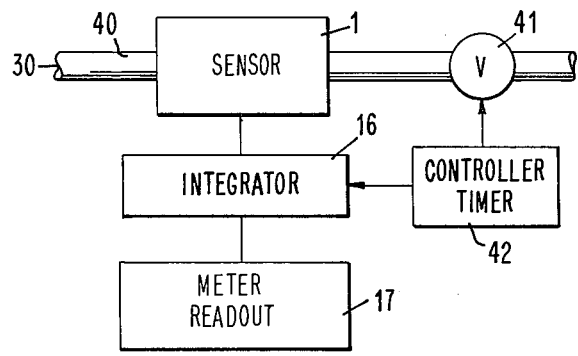
FIG. 4 is a schematic representation of another embodiment of an apparatus for the measurement of chlorine.

In the embodiment shown in FIG. 1, syringe 2 serves as means for introducing the liquid, water, into sensor 1. Syringe 2 serves also as means for stopping the introduction of liquid. Arm 26 actuating switch 27 serves as means of starting the means of integration 16. It is understood that there are other means to perform these operations. For example, piston 2 may be operated by a motor and the integrator may be started by a controller or timer of well known construction. An example of such other means is shown in FIG. 4. Water is entering sensor 1 through inlet 30 of pipe 40. The flow of water may be effected by a pump, by gravity, or by other means. Controller timer 42 is of well known construction controlling the opening and closing of valve 41 and the start of integrator 16 at preselected times. In operation, valve 41 is opened by controller timer 42 so that water flows through sensor 1. Controller 42 then closes valve 42 and starts integrator 16 at about the same time, i.e., preferably within 0.5 seconds or less. After completion of the integration the result can be read on readout device 17. The operation may then be repeated.

Figure 5:
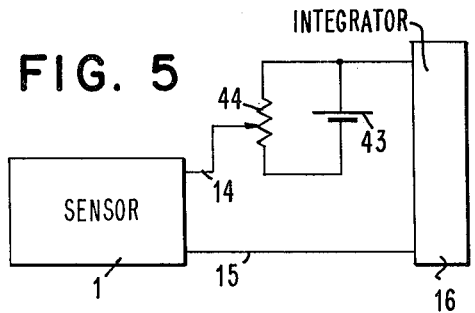
FIG. 5 shows an electric circuit used for applying voltage to the sensor.

While the sensor can be operated as shown above it may be desirable to apply a voltage to the sensor with a circuit such as shown in FIG. 5. A voltage source such as battery 43 supplies voltage to potentiometer 44. Adjustment of potentiometer 44 permits application of the desired voltage to the sensor. The voltage applied is generally in the range of 0 – 1 Volt. The polarity of the voltage may be reversed by reversing the polarity of battery 43 in the circuit. The magnitude and the polarity of the applied voltage depend also on the materials used in the construction of sensor 1.

The apparatus may be used for the measurement of other electro-active species, i.e., species which can be reduced or oxidized electrochemically at an electrode so that an electric current is flowing between electrode 11 and counter electrode 13. Such electro-active species are, for example, bromine, iodine, oxygen, hydrazine, and other inorganic and organic species which are known to be reduced or oxidized electrochemically.

The water sample entering sensor 1 through inlet 30 may be filtered to avoid clogging of sensor 1. The sample may also be conditioned before entering sensor 1 by passing it through a bed of solid reagents or by mixing it with reagents. For example, the pH of the sample may be adjusted with pH buffers.

While I have found it most preferable to have electrode 11 and counter electrode 13 continuously connected to integrator 16 before and during integration results can also be obtained when the electrical connection is broken before integration and is established when integration is started. Also, a different voltage may be applied before integration compared to the voltage applied during integration by means of circuits such as shown in FIG. 5.

The invention may also be used to determine the concentration of species in the gas phase after such species have reacted with a liquid to generate electro-active species in the liquid. The concentration in the liquid may then be measured as described above. For example, traces of ozone and other oxidants in air may be measured. A well known method of determining ozone and/or other oxidants is based on their reaction with aqueous solutions containing iodide, generating iodine.

Figure 6:
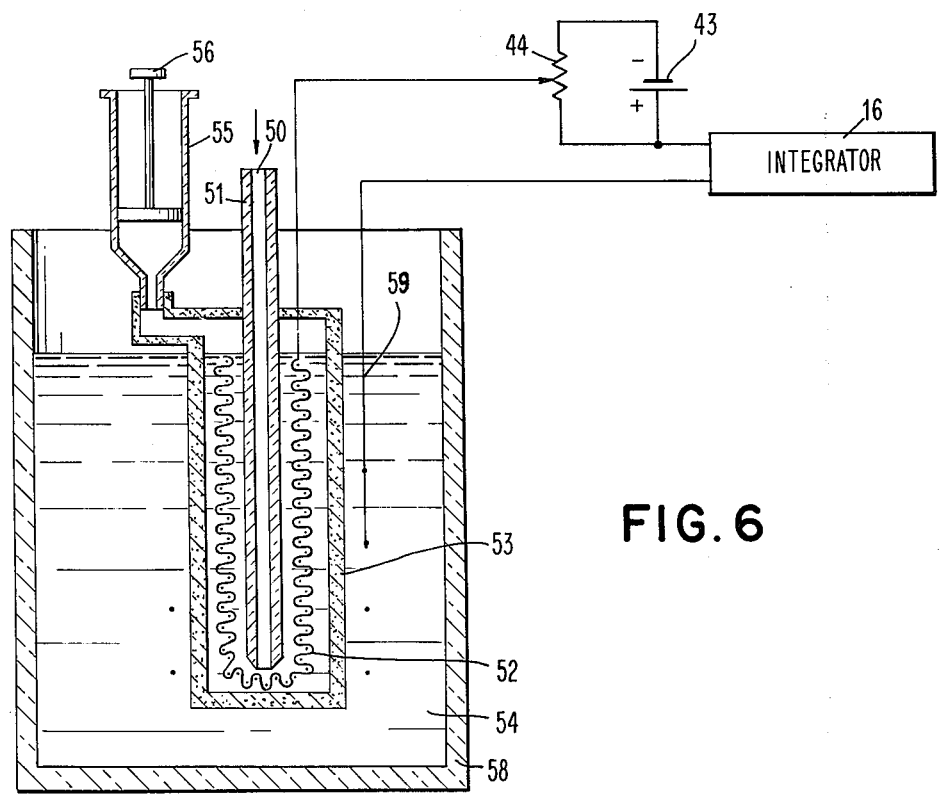
FIG. 6 is a view, partly in cross section, of an apparatus measuring the concentration of halogens which have been generated by the interaction with air containing oxidants such as ozone.

FIG. 6 shows an example of an embodiment of an apparatus for the determination of ozone and other oxidants. Tube 51 which may be of glass or inert plastic such as Teflon is surrounded by a cylindrical structure of platinum wire gauze 52. Porous separator 53 encloses gauze 52. Separator tube 53 may be made of materials such as fritted glass which pass electrolytic current when soaked with electrolyte solution but restrict the flow of electrolyte. Other such materials include, for example, porous plastics and membranes such as cellophane. Also, only parts of separator 53 may have to be porous while other parts may be impermeable for the solution. Platinum wire 59 serves as counter electrode. The structure is immersed in electrolyte solution 54 which may be an iodide containing solution of known composition. Solution 54 fills also the annular space between 51 and 53. Solution 54 is contained in vessel 58. Syringe 55 with piston 56 is connected to the annular space between 51 and 53. Electrode 52 and counter electrode 59 are electrically connected to integrator 16. Potentiometer 44 in connection with battery 43 may be used to apply a voltage between electrodes 52 and 59. Integrator 16 may be connected to a read out device (not shown) and piston 56 may again actuate integrator 16, as shown in FIG. 1.

In operation, piston 56 is raised pulling oxidant-containing gas into inlet 50 of tube 51 and bubbling it through the part of solution 54 which is contained in the annular space between 51 and 53. Integrator 16 is started and the result of integration, after completion of the piston movement, indicates the concentration of oxidant. The integrator may also be started before starting to pull piston 56.

It is understood that sensor 1 is only one example of sensing means which may be used in this invention. While a sensor with cylindrical structure as described above has shown excellent performance other structures may also be used. Such other structure is, for example, a sandwich structure in which the electrode, the separator and the counter electrode form a sandwich which has a small opening between electrode and separator for the introduction of the liquid to be analyzed. In the present invention it is preferable that the electrical current from the sensor decreases rapidly after the flow of liquid to be analyzed is stopped. It is preferable that the sensor current after 2 minutes has decreased to less than 10% of the current which was flowing when integrator 16 was started and when the introduction of liquid was stopped. It is more preferable that the sensor current has decreased after 1 minute to less than 10% of the current which was flowing when integrator 16 was just started and when the introduction of liquid was just stopped.

It is preferable that the time interval between stopping the introduction of liquid into sensor 1 and starting means of integration 16 should be kept to a minimum of less than 4 seconds and, more preferably, to less than 1 second. Results are also obtained when the order of operations is reversed, i.e., when means of integration 16 are started shortly (preferably less than 4 seconds and, more preferably, less than 1 second) before the introduction of liquid is stopped.

It is understood that the foregoing detailed description is merely given by way of illustration and that many variations may be made therein without departing from the spirit of invention. The Abstract is merely given for the convenience of searchers and is not to be given any weight in defining the scope of the invention.

I claim:

1. An apparatus for measuring the concentration of an electroactive species selected from the group consisting of chlorine, bromine, oxygen, iodine and hydrazine in an untreated sample comprising:
    electrochemical sensing means including a cell and first and second electrodes between which an electrical current will flow when said untreated sample containing any of said electro-active species is introduced into said cell to provide electrolytic conduction between said first and second electrodes, said electrolytic conduction occurring in the absence of any other electrolyte in contact with either of said electrodes,
    input means for introducing a given amount of said untreated sample into said cell, said sample being substantially free of any reagent therein which would tend to alter said electroactive species in said sample,
    measuring means for measuring the integration over time of said electrical current when said untreated sample is introduced into said cell, and
    means coupled to said measuring means for initiating the integration of said electrical current by said measuring means when said given amount of sample is introduced into said cell, said means for initiating being responsive to the mechanical action of said input means.

2. The apparatus of claim 1 where said input means for introducing said untreated sample is a syringe having a piston whose travel actuates said means for initiating.

3. The apparatus of claim 2 where said first electrode is comprised of a material selected from the group consisting of noble metals and graphite and said second electrode is comprised of a material selected from the group consisting of Cu, Ag, and graphite.

4. The apparatus of claim 1 where said first electrode is comprised of a material selected from the group consisting of noble metals and graphite and said second electrode is comprised of a material selected from the group consisting of Cu, Ag, and graphite.

5. The apparatus of claim 1 including a porous spacer located between said first and second electrodes.

6. The apparatus of claim 1 further including means for displaying the output of said measuring means in terms of the amount of said electroactive species present in said sample.

7. The apparatus of claim 1 where said first electrode is Pt and said second electrode is Cu.

8. An apparatus for measuring the concentration of an electroactive species selected from the group consisting of chlorine, bromine, oxygen, iodine and hydrazine in a sample, comprising:
    electrochemical sensing means including a cell and first and second electrodes between which an electrical current will flow when said sample containing any of said electroactive species is introduced into said cell to provide electrolytic conduction between said first and second electrodes,
    input means integral with said cell for introducing a given amount of said sample into said cell, said input means being comprised of a mechanical member capable of motion which introduces said sample into said cell,
    measuring means for integrating said electrical current over time when said given amount of sample is introduced into said cell, said measuring means being activated in response to a trigger input dependent on the said given amount of said sample being introduced into said cell, and
    triggering means responsive to the movement of said mechanical member in said input means for providing said trigger input to said measuring means when said given amount of sample is introduced into said cell.

9. The apparatus of claim 8 where said mechanical member is a piston which actuates said trigger means during its travel.

10. The apparatus of claim 9 where said triggering means is a switch activated by the movement of said piston.

* * * * *